United States Patent
Erker (10) Patent No.: US 9,816,841 B2
(45) Date of Patent: Nov. 14, 2017

(54) METHOD FOR DETECTING A POSITION OF AN ACTUATOR

(71) Applicant: CNH Industrial Canada, Ltd., Saskatoon (CA)

(72) Inventor: Gregoy J. Erker, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/273,061

(22) Filed: Sep. 22, 2016

(65) Prior Publication Data
US 2017/0010131 A1    Jan. 12, 2017

Related U.S. Application Data

(62) Division of application No. 13/655,122, filed on Oct. 18, 2012, now Pat. No. 9,470,556.

(51) Int. Cl.
G01D 5/245    (2006.01)

(52) U.S. Cl.
CPC .................. *G01D 5/2455* (2013.01)

(58) Field of Classification Search
None
See application file for complete search history.

(56) References Cited

U.S. PATENT DOCUMENTS

| 3,815,126 | A | 6/1974 | Batz |
|---|---|---|---|
| 4,701,615 | A | 10/1987 | Schmitt |
| 4,851,771 | A | 7/1989 | Ikeda et al. |
| 4,914,437 | A | 4/1990 | Kibrick et al. |
| 4,914,566 | A | 4/1990 | Steutermann |
| 4,947,166 | A | 8/1990 | Wingate et al. |
| 5,434,602 | A | 7/1995 | Kaburagi et al. |
| 6,147,342 | A | 11/2000 | Kucher |
| 6,603,115 | B1 | 8/2003 | Gordon-Ingram |
| 6,658,747 | B2 | 12/2003 | Kuru |
| 6,756,759 | B2 | 6/2004 | Yamashita |
| 7,091,883 | B2 | 8/2006 | Kunow et al. |
| 7,123,027 | B2 | 10/2006 | Tola et al. |
| 7,289,041 | B2 | 10/2007 | Dalton |
| 7,307,418 | B2 | 12/2007 | Low et al. |
| 7,835,014 | B2 | 11/2010 | Mayer et al. |

(Continued)

OTHER PUBLICATIONS

Process Peripherals, 2004 IAS, Universität Stuttgart, 90 pages.*

*Primary Examiner* — Tung Lau
(74) *Attorney, Agent, or Firm* — Rebecca L. Henkel; Rickard K. DeMille (57) ABSTRACT

An encoding sequence is configured to detect the position and direction of motion of an actuator. The actuator includes at least two members where one of the members moves with respect to the other. Two sets of binary indicators are either affixed to or integrally assembled along one of the members. Each pair of indicators defines a position of the actuator and each binary indicator is configured to identify one of two states, such as a magnetic pole or a graphical mark where each state corresponds to a logical zero or a logical one. The indicators are arranged on the actuator such that at least one of the indicators transitions between one of the two states at each position along the actuator. At least one sensor is provided to detect the state of the binary indicators as the two members of the actuator move with respect to each other.

6 Claims, 6 Drawing Sheets

(56) References Cited

U.S. PATENT DOCUMENTS

| | | |
|---|---|---|
| 7,835,883 B2 | 11/2010 | Takeuchi |
| 7,843,191 B2 | 11/2010 | Arns et al. |
| 8,069,772 B1 | 12/2011 | Peterson |
| 2004/0222788 A1* | 11/2004 | Low .................... F15B 15/2846 324/207.22 |
| 2008/0116881 A1 | 5/2008 | May |
| 2010/0107869 A1 | 5/2010 | Fitzkee et al. |
| 2011/0062948 A1 | 3/2011 | Arns, Jr. et al. |
| 2011/0314952 A1 | 12/2011 | Koo |

* cited by examiner

|  | B0 | B1 | B2 | B3 |
|---|---|---|---|---|
| 25→CLK | 1 | 0 | 1 | 1 |
| 27→FWD | X | 1 | 1 | 1 |
| 29→REV | 0 | 1 | 1 | 1 |

|  | S0 | B0 | B1 | B2 | B3 | S0 | B0 | B1 | B2 | B3 | S0 | B0 | B1 | B2 | B3 |
|---|---|---|---|---|---|---|---|---|---|---|---|---|---|---|---|
| 30→DATA | 1 | 0 | 0 | 0 | 0 | 1 | 0 | 0 | 0 | 1 | 1 | 0 | 1 | 0 | 0 |
| 31→FWD | X | 1 | 0 | 0 | 0 | 0 | 1 | 0 | 0 | 1 | 1 | 1 | 1 | 1 | 0 |
| 33→REV | 1 | 0 | 1 | 0 | 0 | 1 | 1 | 0 | 1 | 1 | 1 | 1 | 0 | 1 | X |
| 32→POS | 0 | 1 | 2 | 3 | 4 | 5 | 6 | 7 | 8 | 9 | 10 | 11 | 12 | 13 | 14 |

FIG. 6

|  | B0 | B1 | B2 | B3 | B4 |
|---|---|---|---|---|---|
| 25→CLK | 1 | 0 | 1 | 1 | 1 |
| 27→FWD | X | 1 | 1 | 1 | 1 |
| 29→REV | 0 | 1 | 1 | 1 | 1 |

|  | S0 | B0 | B1 | B2 | B3 | B4 | S0 | B0 | B1 | B2 | B3 | B4 | S0 | B0 | B1 | B2 | B3 | B4 |
|---|---|---|---|---|---|---|---|---|---|---|---|---|---|---|---|---|---|---|
| 30→DATA | 1 | 0 | 0 | 0 | 0 | 0 | 1 | 0 | 0 | 0 | 0 | 1 | 1 | 0 | 1 | 1 | 0 | 0 |
| 31→FWD | X | 1 | 0 | 0 | 0 | 0 | 0 | 1 | 0 | 0 | 0 | 1 | 1 | 1 | 1 | 1 | 1 | 0 |
| 33→REV | 1 | 0 | 1 | 0 | 0 | 0 | 1 | 1 | 0 | 1 | 0 | 1 | 1 | 1 | 0 | 1 | 0 | X |
| 32→POS | 0 | 1 | 2 | 3 | 4 | 5 | 6 | 7 | 8 | 9 | 10 | 11 | 12 | 13 | 14 | 15 | 16 | 17 |

| | S0 | S1 | B0 | S2 | B1 | B2 | B3 | S0 | S1 | B0 | S2 | B1 | B2 | B3 | S0 | S1 | B0 | S2 | B1 | B2 | B3 |
|---|---|---|---|---|---|---|---|---|---|---|---|---|---|---|---|---|---|---|---|---|---|
| CLK (25) | 0 | 0 | 1 | 1 | 0 | 1 | 0 | 0 | 0 | 1 | 1 | 0 | 1 | 0 | 0 | 0 | 1 | 1 | 0 | 1 | 0 |
| FWD (27) | X | 0 | 1 | 0 | 1 | 1 | 1 | 1 | 1 | 1 | 1 | 1 | 1 | 1 | 1 | 1 | 1 | 1 | 1 | 1 | X |
| REV (29) | 0 | 1 | 0 | 1 | 0 | 0 | 1 | 1 | 0 | 0 | 0 | 0 | 0 | 0 | 0 | 0 | 0 | 0 | 0 | 0 | X |
| DATA (30) | 0 | 1 | 1 | 0 | 1 | 0 | 0 | 1 | 1 | 1 | 0 | 0 | 1 | 0 | 1 | 1 | 0 | 1 | 0 | 0 | 0 |
| FWD (31) | X | 1 | 0 | 1 | 0 | 0 | 0 | 1 | 1 | 1 | 0 | 0 | 1 | 0 | 0 | 1 | 1 | 0 | 1 | 0 | 0 |
| REV (33) | 0 | 1 | 0 | 1 | 1 | 1 | 1 | 0 | 0 | 0 | 1 | 1 | 0 | 1 | 1 | 1 | 1 | 0 | 1 | 0 | 0 |
| POS (32) | 0 | 1 | 2 | 3 | 4 | 5 | 6 | 7 | 8 | 9 | 10 | 11 | 12 | 13 | 14 | 15 | 16 | 17 | 18 | 19 | 20 |

FIG. 9

| | S0 | S1 | B0 | S2 | B1 | B2 | B3 | B4 | S0 | S1 | B0 | S2 | B1 | B2 | B3 | B4 | S0 | S1 | B0 | S2 | B1 | B2 | B3 | B4 |
|---|---|---|---|---|---|---|---|---|---|---|---|---|---|---|---|---|---|---|---|---|---|---|---|---|
| CLK (25) | 0 | 0 | 1 | 1 | 0 | 1 | 0 | 1 | 0 | 0 | 1 | 1 | 0 | 1 | 0 | 1 | 0 | 0 | 1 | 1 | 0 | 1 | 0 | 1 |
| FWD (27) | X | 0 | 1 | 0 | 1 | 1 | 1 | 1 | 1 | 1 | 1 | 1 | 1 | 1 | 1 | 1 | 1 | 1 | 1 | 1 | 1 | 1 | 1 | X |
| REV (29) | 0 | 1 | 0 | 1 | 0 | 0 | 0 | 1 | 1 | 0 | 0 | 0 | 0 | 0 | 0 | 0 | 0 | 0 | 0 | 0 | 0 | 0 | 0 | X |
| DATA (30) | 0 | 1 | 1 | 0 | 1 | 0 | 0 | 0 | 1 | 1 | 0 | 1 | 0 | 0 | 0 | 1 | 1 | 1 | 0 | 1 | 1 | 0 | 0 | 0 |
| FWD (31) | X | 1 | 0 | 1 | 0 | 0 | 0 | 0 | 1 | 1 | 0 | 1 | 0 | 0 | 0 | 1 | 1 | 1 | 0 | 1 | 1 | 0 | 0 | 0 |
| REV (33) | 0 | 1 | 0 | 1 | 1 | 1 | 1 | 1 | 0 | 0 | 1 | 0 | 1 | 1 | 1 | 0 | 0 | 0 | 1 | 0 | 0 | 1 | 1 | 0 |
| POS (32) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

METHOD FOR DETECTING A POSITION OF AN ACTUATOR

CROSS-REFERENCE TO RELATED APPLICATION

The present application is a divisional of application Ser. No. 13/655,122 filed Oct. 18, 2012.

BACKGROUND OF THE INVENTION

The subject matter disclosed herein relates generally to an apparatus for detecting position, and in particular, to an encoding sequence to detect the position and direction of motion of an actuator.

As is known, actuators are controlled devices that transfer energy from a source to an object to induce operation of that object. Actuators may be driven, for example, by a variety of sources including, but not limited to, electrical, hydraulic, or pneumatic. In response to energy from the source, the actuator may generate a rotational or linear force to drive, for example, a ball screw or a piston. In some applications, the actuator may simply turn on or off and may be controlled by limit switches or positive stops at the end of travel. In other applications, it is desirable to have more precise control of the actuator, requiring knowledge of the current position of the actuator.

Historically, numerous encoding schemes have been used to obtain the current position of an actuator. If the actuator is driven by a rotational force, such as a motor, a rotational position sensor such as an encoder or resolver may be attached to the motor. Knowledge of the angular position of the motor is converted to a corresponding position of the actuator. If the actuator is driven by a linear force, such as a hydraulic cylinder, a linear position sensor may be attached to the cylinder to obtain a position measurement.

Numerous encoding techniques have been employed in conjunction with the position sensors to obtain the desired position information. A physically detectable pattern may be affixed to or integrally assembled on the actuator. A sensor head is provided to detect the pattern and generate signals corresponding to the pattern. One such pattern utilizes multiple bits at each position that provide a unique identifier, or number, for each position. The number may represent a binary coded number or another number encoded according to another scheme, such as Gray code. However, as the length of travel of the actuator and/or the desired precision increases, the number of bits required to identify each of the positions also increases. The sensor head and accompanying control electronics must be configured to read and to process the increased number of bits. Thus, it would be desirable to provide an encoding sequence that utilizes a reduced number of bits to define each of the positions over the length of travel of the actuator.

Whether rotational or linear, the position sensors may be further classified as incremental or absolute. An incremental sensor starts at zero upon power up and maintains a record of movement of the actuator in either a positive or negative direction from the initial position. A known reference point, or home position, may also be used to reset the incremental sensor and subsequently control motion of the actuator from the known reference point. An absolute position sensor is similarly reset to a known reference point during initial configuration; however, the absolute position sensor maintains knowledge of the current position when power to the sensor is cycled.

In order to maintain knowledge of the current position, either static memory (i.e., data is retained during a power cycle) is required or the encoding sequence must provide a unique sequence of data at each position. However, each of these implementations has certain disadvantages. Static memory is not effective if there is potential for movement of the actuator while power is off in which case the retained value will not be correct upon power up. Providing a unique identifier for each position may require an increased number of bits for each identifier and related circuitry to read each bit. Thus, it would be desirable to provide an encoding sequence from which the current position of the actuator may be determined upon power up while maintaining a reduced number of bits to define each of the positions over the length of travel of the actuator.

SUMMARY OF THE INVENTION

The present invention relates to an encoding sequence to detect the position and direction of motion of an actuator. The actuator includes at least two members where one of the members moves with respect to the other. Two sets of binary indicators are either affixed to or integrally assembled along one of the members. Each pair of indicators defines a position of the actuator and each binary indicator is configured to identify one of two states, such as the presence or absence of a mark or a magnetic north or south pole, and each state corresponds to a logical zero or a logical one. The indicators are arranged on the actuator such that at least one of the binary indicators transitions between one of the two states at each position along the actuator. At least one sensor is provided to detect the state of the binary indicators as the two members of the actuator move with respect to each other.

According to a first embodiment of the invention, a method for detecting a position of an actuator having a first set of binary indicators affixed to the actuator and a second set of binary indicators affixed to the actuator is disclosed. Each of the indicators in the first and second sets of binary indicators defines a bit, and each of the first and second sets of binary indicators has a predefined word length equal to multiple bits. The method includes the steps of moving the actuator a distance corresponding to the word length of each set of the binary indicators, sensing the first and second sets of binary indicators while moving the actuator, and determining the position of the actuator as a function of the first and second sets of binary indicators. Sensing the first and second sets of binary indicators may further include the steps of detecting a change of state in each of the first and second sets of binary indicators, generating a first signal corresponding to the change in state in the first set of binary indicators; and generating a second signal corresponding to the change in state of the second set of binary indicators. At least one of the first and second sets of binary indicators changes state at each position. The method may further include the step of determining a direction of motion of the actuator as a function of the first and second signals.

According to another aspect of the invention, the word length for each of the first set and second set of binary indicators may be defined by a first start bit, a second start bit, and a plurality of data bits. The first and second start bits of the first set of binary indicators may be set equal to each other. For, the second set of binary indicators, one of the first and second start bits may be set to a logical one and the other of the first and second start bits may be set to a logical zero.

According to still another aspect of the invention, the word length for each of the first set and second set of binary indicators may be defined by a first start bit and a plurality of data bits. For the first set of binary indicators, the start bit may be set equal to the first data bit and the remaining data bits alternate from the previous data bit. For the second set of binary indicators, the start bit may be set opposite to the first data bit.

According to yet another aspect of the invention, the word length for each of the first set and second set of binary indicators may be defined by a first start bit, a second start bit, a third start bit, and a plurality of data bits. Each of the first, second, and third start bits of the first set of binary indicators may be set equal to the bit preceding the respective start bit, and each of the first, second, and third start bits of the second set of binary indicators may be set opposite to the bit preceding the respective start bit.

According to another embodiment of the invention, a system for detecting a position of an actuator having a first member and a second member movable with respect to the first member includes a first set of binary indicators located on the first member of the actuator. The first set of binary indicators has a predefined word length, each binary indicator defines one bit within the word, and each binary indicator defines a position of the first member with respect to the second member. A second set of binary indicators is also located on the first member of the actuator. Each of the binary indicators in the second set corresponds to one of the binary indicators in the first set. At least one sensor is configured to generate a first signal corresponding to the state of the first set of binary indicators and to generate a second signal corresponding to the state of the second set of binary indicators. A logic circuit is configured to receive each of the signals corresponding to the state of the first and second set of binary indicators and to detect the position of the first member of the actuator with respect to the second member.

According to another aspect of the invention, a first sensor may be configured to detect the state of the first set of binary indicators and to generate the first signal corresponding to the state of the first set of binary indicators, and a second sensor may be configured to detect the state of the second set of binary indicators and to generate the second signal corresponding to the state of the second set of binary indicators. The first signal may identify a change of state of the binary indicators between adjacent positions in the first set of binary indicators, and the second signal may identify a change of state of the binary indicators between adjacent positions in the second set of binary indicators.

According to still another aspect of the invention, the first set of binary indicators may include a first start bit set to one of a first state or a second state and a second start bit set to the same state as the first start bit. The second set of binary indicators may include a first start bit set to one of the first state or the second state and a second start bit set to the opposite state of the first start bit.

According to yet another aspect of the invention, the first set of binary indicators may include a start bit set to one of a first state and a second state and a plurality of data bits. Each data bit of the first set of binary indicators is set to one of the first state and the second state, and the start bit is set to the same state as the first data bit from the plurality of data bits. The second set of binary indicators may include a start bit set to one of a first state and a second state and a plurality of data bits. Each data bit of the second set of binary indicators bit may be set to one of the first state and the second state, and the start bit is set to the opposite state as the first data bit from the plurality of data bits.

According to another aspect of the invention, the first set of binary indicators may includes a first start bit set to one of a first state and a second state, a second start bit set to one of the first state and the second state, and a third start bit set to one of the first state and the second state. The second set of binary indicators may include a first start bit set to one of the first state and the second state, a second start bit set to one of the first state and the second state, and a third start bit set to one of the first state and the second state. Each of the first, second, and third start bits of the first set of binary indicators is set to the same state as the bit preceding the respective start bit, and each of the first, second, and third start bits of the second set of binary indicators is set to the opposite state as the bit preceding the respective start bit.

According to still other aspects of the invention, each of the binary indicators may be magnetic regions. A magnetic north pole corresponds to one of a logical zero or logical one, and a magnetic south pole corresponds to the other of the logical zero or logical one. Optionally, the presence of either a magnetic north or south pole corresponds to one of a logical zero or logical one and the absence of the pole corresponds to the other of a logical zero or logical one Each of the binary indicators may be one of a raised portion or a recessed portion. One of the raised portion or the recessed portion corresponds to one of a logical zero or logical one, and the other of the raised portion or the recessed portion corresponds to the other of the logical zero or logical one. Each of the binary indicators may be the presence or absence of a mark. One of the presence or absence of the mark corresponds to one of a logical zero or logical one, and the other of the presence or absence of the mark corresponds to the other of a logical zero or logical one.

According to still another embodiment of the invention, a method of determining a position of an actuator using a first set of binary indicators and a second set of binary indicators is disclosed. Each of the first and second sets of binary indicators has a predefined word length. The method includes the steps of defining a plurality of positions along the range of motion of the actuator, assigning a binary indicator from the first set of binary indicators to each of the plurality of positions, assigning a binary indicator from the second set of binary indicators to each of the plurality of positions, and detecting a change in state for each set of binary indicators between adjacent positions for a number of adjacent positions equal to the predefined word length. At least one of the first and second sets of binary indicators changes states between each adjacent position.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION

The various features and advantageous details of the subject matter disclosed herein are explained more fully with reference to the non-limiting embodiments described in detail in the following description.

Figure 1:
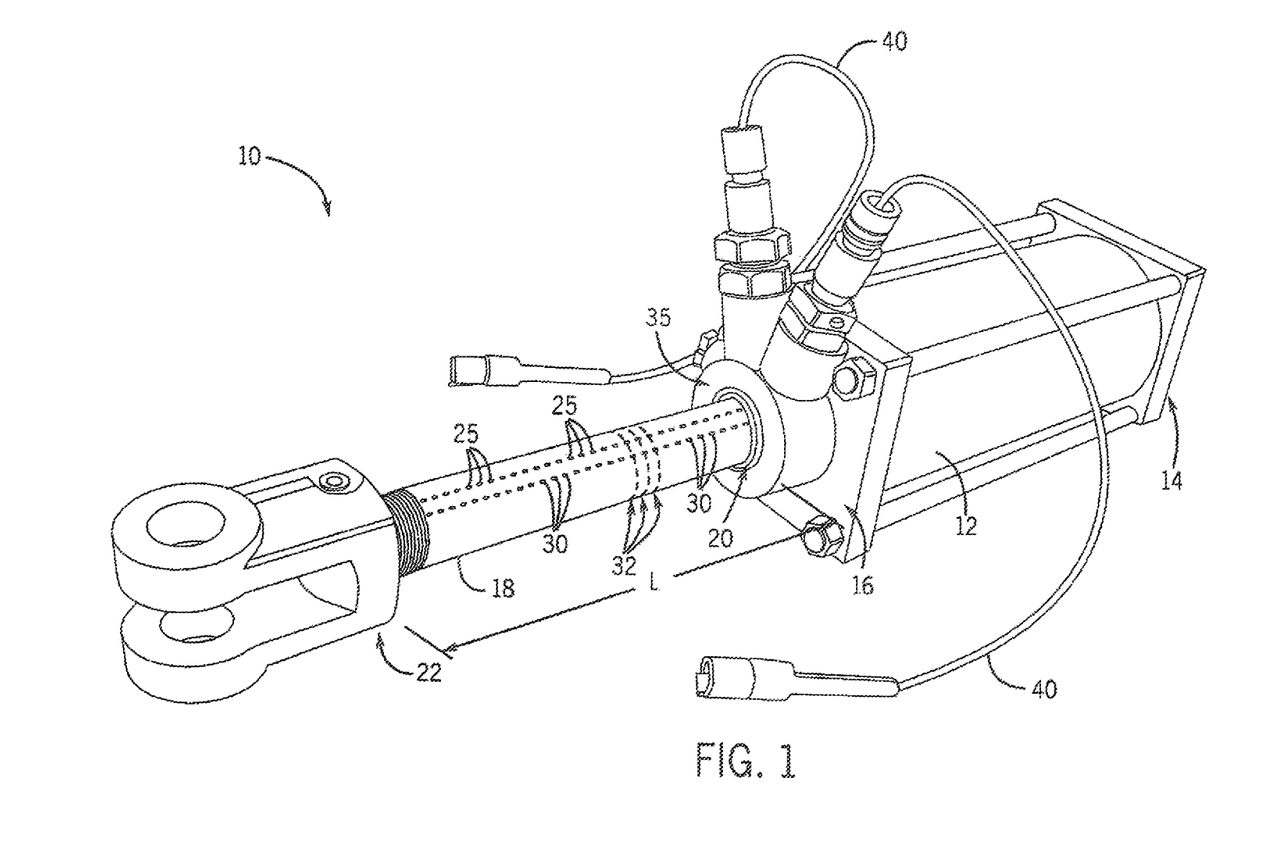
FIG. 1 is a perspective view of an exemplary hydraulic cylinder incorporating the encoding sequence of the present invention according to one embodiment of the invention.
Figure 2:
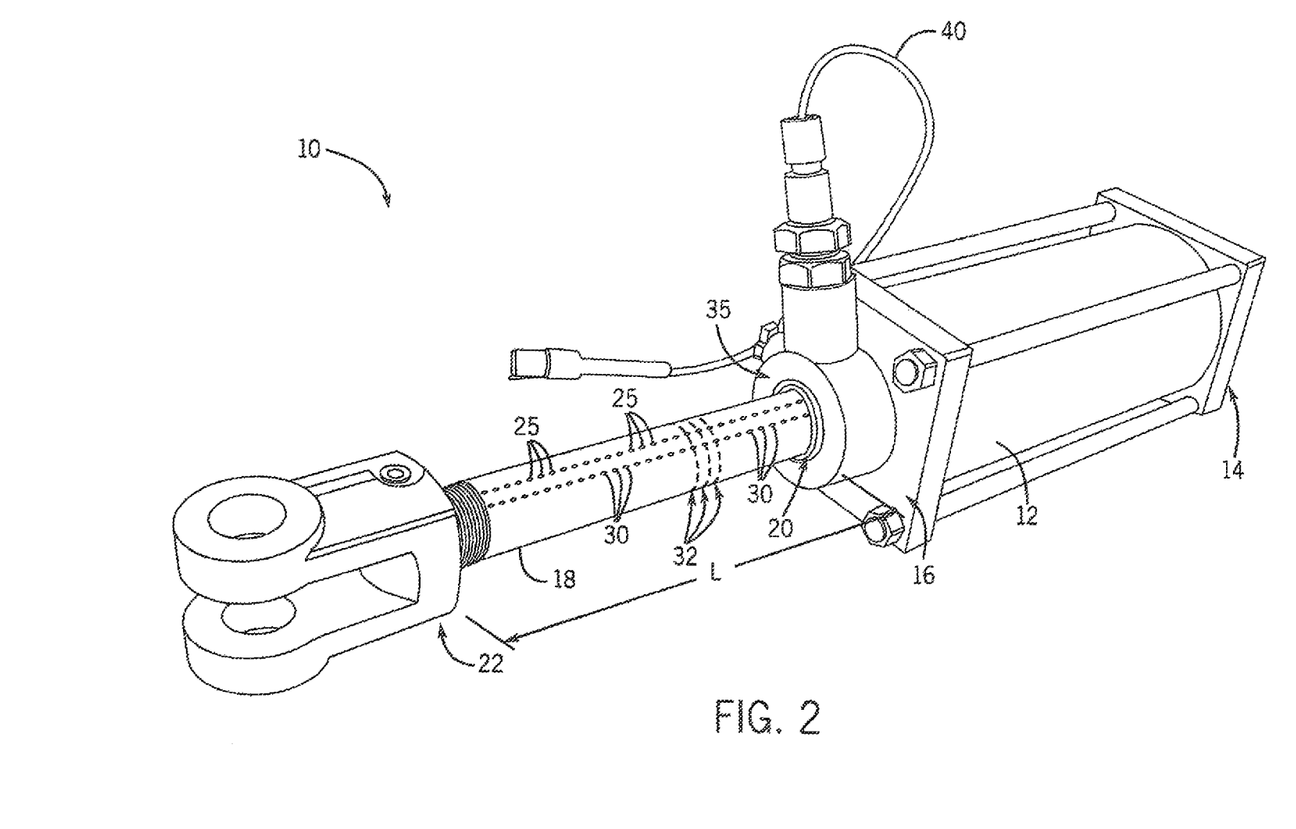
FIG. 2 is a perspective view of an exemplary hydraulic cylinder incorporating the encoding sequence of the present invention according to another embodiment of the invention.

Referring to FIGS. 1-2, a hydraulic cylinder 10 is an exemplary actuator incorporating one embodiment of the encoding sequence according to the present invention. The hydraulic cylinder 10 includes a barrel 12, having a first end 14 and a second end 16, and a rod 18, having a first end 20 and a second end 22. The first end 14 of the barrel 12 and the second end 22 of the rod 18 are configured to be mounted to an object on which the cylinder is configured to operate. The first end 20 of the rod 18 slidably engages the second end 16 of the barrel 12 and moves between a fully retracted position and a fully extended position. The length L of the rod 18 is divided into multiple segments. Each segment defines a position 32 of the rod 18 between the fully retracted and fully extended positions.

An encoding sequence is applied along the rod 18 of the hydraulic cylinder 10 to identify each of the positions 32 along the rod 18. The encoding sequence includes a first set of binary indicators 25 and a second set of binary indicators 30. A binary indicator as used herein is defined as a device that indicates one of two states, including, but not limited to, on or off, present or absent, zero or one, and north or south. Suitable binary indicators include, for example, the presence or absence of a marking, the north or south pole of a magnet, and the presence or absence of a raised member or recessed section. For each position 32 defined along the rod 18, each set of binary indicators 25, 30 will have an indication of one of the two states used by the binary indicator. Thus, each position 32 is identified by an identifier having just two bits (i.e., one bit from the first set of binary indicators 25 and one bit from the second set of binary indicators 30).

Each set of binary indicators 25, 30 is oriented to be sequentially detected as the actuator moves. As illustrated, the first and second set of binary indicators 25, 30, respectively, are linearly positioned along the length L of the rod 18. Optionally, the binary indicators may be positioned around the periphery of a rotating actuator. According to still another embodiment, the binary indicators may be positioned along a stationary member and a sensor head affixed to a moving member of the actuator. At least one sensor head 35 detects each of the binary indicators. In one embodiment of the invention, a single sensor head 35 detects both of the first and second set of binary indicators 25, 30, respectively. The sensor head 35 generates a signal corresponding to the state of the binary indicator in each of the sets of indicators 25, 30 at each position 32. According to another embodiment of the invention, two sensor heads 35 are provided. The first sensor head 35 detects the state of the binary indicator for the first set of binary indicators 25 at each position 32, and the second sensor head 35 detects the state of the binary indicator for the second set of binary indicators 30 at each position 32. Each sensor head 35 generates the signal corresponding to the state of the binary indicator from its corresponding set of indicators 25, 30. The signal is transferred to a suitable logic circuit 50, see also FIG. 3, via a cable 40 electrically connected to the sensor head 35.

Figure 3:
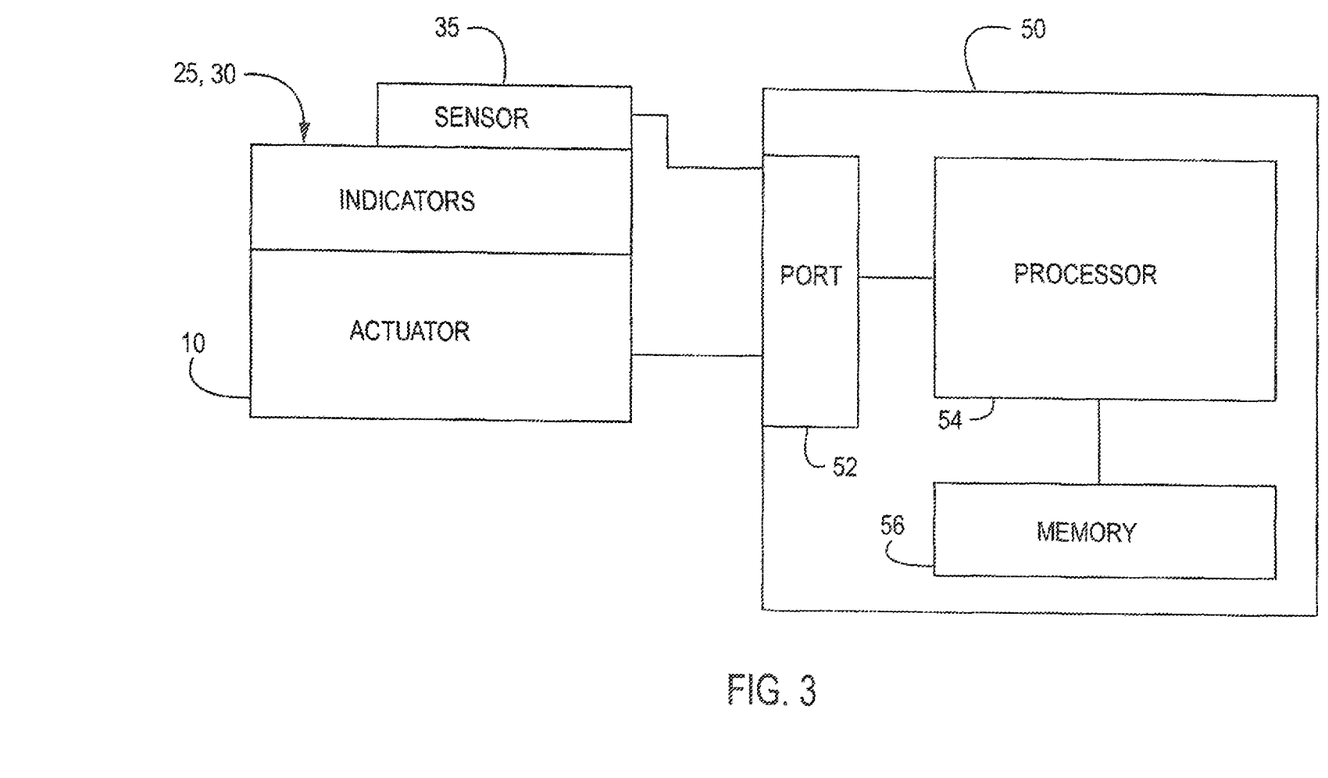
FIG. 3 is a block diagram representation of a controller used with the hydraulic cylinder of FIG. 1.

Referring next to FIG. 3, an exemplary logic circuit 50 configured to receive signals from the sensor head 35 is illustrated. According to one embodiment of the invention, the logic circuit 50 includes a processor 54 in communication with a memory device 56. The memory device 56 stores a series a program which includes a series of instructions executable by the processor 54. The processor 54 is in communication with a port 52 which may be external to or integral with the processor 54. The port 52 is configured to receive each of the first and second signals from the sensor head 35. The program may further include instructions executable by the processor 54 to control the actuator 10 as a function of the signals from the sensor head 35. The processor 54 and memory 56 may be separate devices or integrated, for example, on a field programmable gate array (FPGA) or an application specific integrated circuit (ASIC). According to another embodiment of the invention, discrete logic elements may be used to receive and process the signals from the sensor head 35. Optionally, a portion of or the entire logic circuit 50 may be integrated into the sensor head 35 and outputs corresponding to position and/or direction of motion may be output to an external device.

Figure 4:
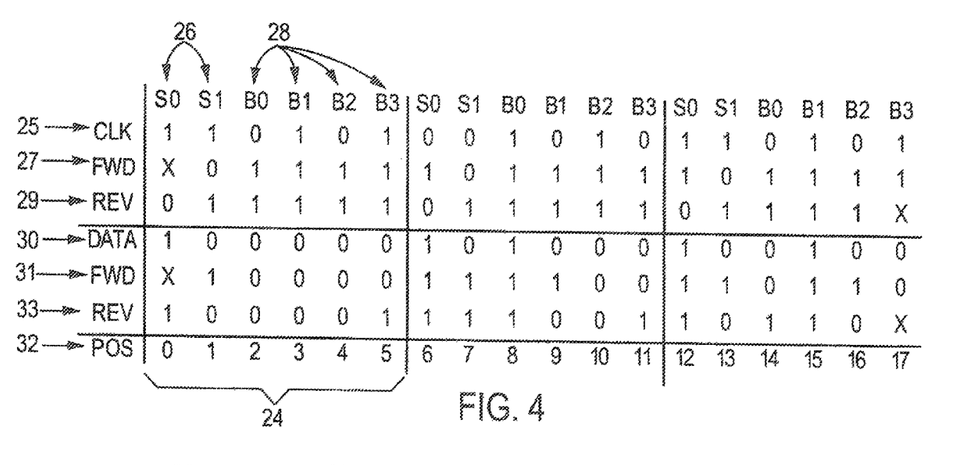
FIG. 4 is a graphical representation of the encoding sequence according to one embodiment of the present invention having an even word length.
Figure 5:
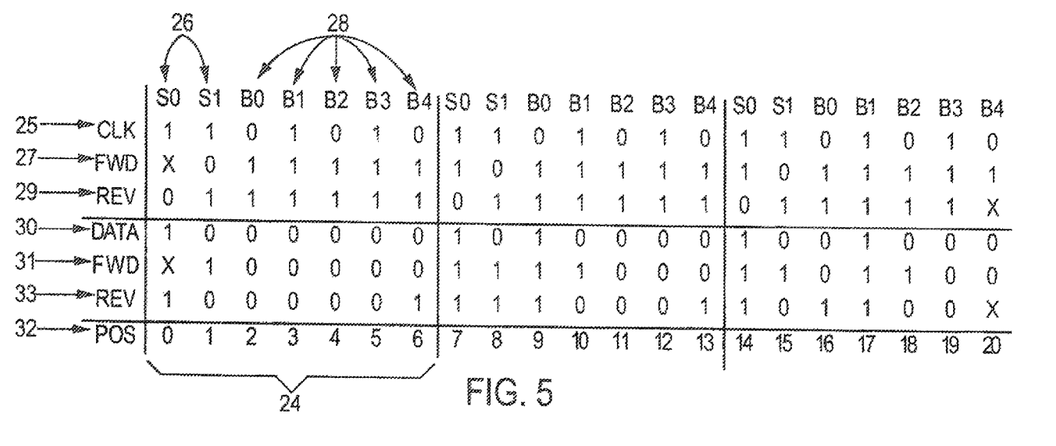
FIG. 5 is a graphical representation of the encoding sequence according to one embodiment of the present invention having an odd word length.

Referring next to FIGS. 4 and 5, an encoding sequence according to a first embodiment of the invention is illustrated. The first set of binary indicators 25 is also identified as the clock sequence CLK, and the second set of binary indicators 30 is also identified as the data sequence DATA. FIG. 4 illustrates an encoding sequence in which the word length 24 is an even number, and FIG. 5 illustrates an encoding sequence in which the word length 24 is an odd number. As illustrated, the word length 24 of FIG. 4 for each set of indicators 25, 30 is six, containing two start bits 26 (i.e., S0 and S1) and four data bits 28 (i.e., B0, B1, B2, and B3), and the word length 24 of FIG. 5 for each set of indicators 25, 30 is seven, containing two start bits 26 (i.e., S0 and S1) and five data bits 28 (i.e., B0, B1, B2, B3, and B4). Each of the start bits 26 in the first set of binary indicators 25 are set equal to each other. The data bits 28 in the first set of binary indicators 25 are then set to the opposite state of the preceding bit. The first start bit S0 of the next word is set to the opposite state of the preceding data bit. For an even word length 24, the start bits 26 in the first set of binary indicators 25 will, therefore, alternately be set to a one-one combination and a zero-zero combination. For an odd word length 24, the start bits 26 in the first set of binary indicators 25 will always be set to the same combination, either a one-one or a zero-zero combination. The two start bits 26 in the second set of binary indicators 30 are set to either a one-zero combination or a zero-one combination such that the two start bits 26 are of an opposite state from each other. The data bits 28 of the second set of binary indicators 30 define binary numbers between zero and $2^n-1$ where "n" is the number of data bits 28 present in the second set of binary indictors 30.

Figure 6:
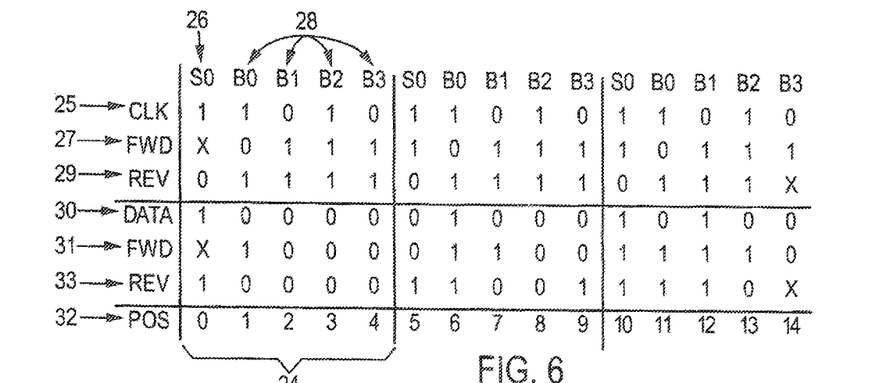
FIG. 6 is a graphical representation of the encoding sequence according to another embodiment of the present invention having an odd word length.
Figure 7:
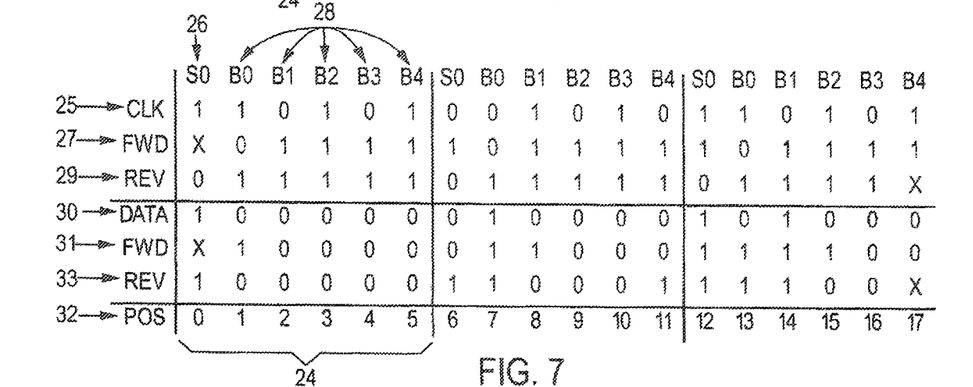
FIG. 7 is a graphical representation of the encoding sequence according to another embodiment of the present invention having an even word length.

Referring next to FIGS. 6 and 7, an encoding sequence according to another embodiment of the invention is illustrated. The first set of binary indicators 25 is again identified as the clock sequence CLK, and the second set of binary indicators 30 is again identified as the data sequence DATA. FIG. 6 illustrates an encoding sequence in which a word length 24 is an odd number, and FIG. 7 illustrates an encoding sequence in which the word length 24 is an even number. As illustrated, the word length 24 of FIG. 6 for each set of indicators 25, 30 is five, containing one start bit 26 (i.e., S0) and four data bits 28 (i.e., B0, B1, B2, and B3), and the word length 24 of FIG. 7 for each set of indicators 25, 30 is six, containing one start bit 26 (i.e., S0) and five data bits 28 (i.e., B0, B1, B2, B3, and B4). In the first set of binary indicators 25, the start bit 26 is set equal to the first data bit 28. Each of the data bits 28 beyond the first data bit 28 in the first set of binary indicators 25 are then set to the state opposite the state of the preceding bit. The start bit S0 of the next word is set to the opposite state of the preceding data bit. For an odd word length 24, the start bit 26 and the first data bit 28 in the first set of binary indicators 25 will always be set to the same combination, either a one-one or a zero-zero combination. For an even word length 24, the start bit 26 and the first data bit 28 in the first set of binary indicators 25 will alternately be set to a one-one combination and a zero-zero combination. The start bit 26 in the second set of binary indicators 30 is set to the opposite state of the first data bit 28. The data bits 28 of the second set of binary indicators 30 define binary numbers between zero and $2^n-1$ where "n" is the number of data bits 28 present in the second set of binary indictors 30.

Figure 8:
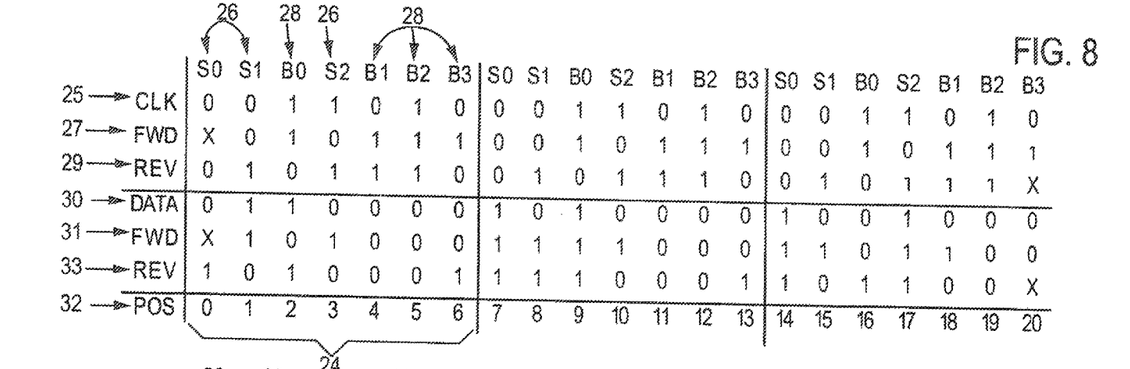
FIG. 8 is a graphical representation of the encoding sequence according to still another embodiment of the present invention having an odd word length.
Figure 9:
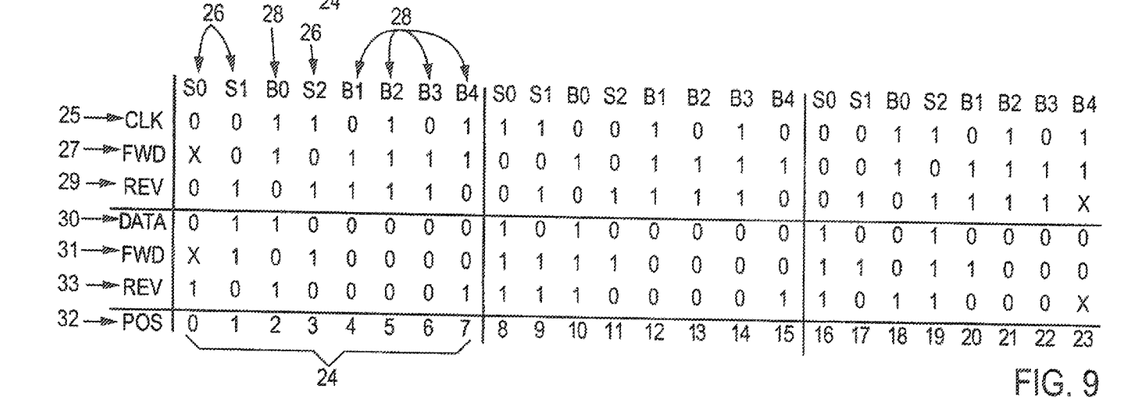
FIG. 9 is a graphical representation of the encoding sequence according to still another embodiment of the present invention having an even word length.

Referring next to FIGS. 8 and 9, an encoding sequence according to yet another embodiment of the invention is illustrated. The first set of binary indicators 25 is again identified as the clock sequence CLK, and the second set of binary indicators 30 is again identified as the data sequence DATA. FIG. 8 illustrates an encoding sequence in which a word length 24 is an odd number, and FIG. 9 illustrates an encoding sequence in which the word length 24 is an even number. As illustrated, the word length 24 of FIG. 8 for each set of indicators 25, 30 is seven, containing three start bits 26 (i.e., S0, S1, and S2) and four data bits 28 (i.e., B0, B1, B2, and B3), and the word length 24 of FIG. 9 for each set of indicators 25, 30 is eight, containing three start bits 26 (i.e., S0, S1, and S2) and five data bits 28 (i.e., B0, B1, B2, B3, and B4). In the first set of binary indicators 25, each of the start bits 26 is set equal to the preceding bit. The initial start bit (i.e., S0 of the first word) may be selected as either a zero or a one. For an odd word length, the start bits 26 repeat in the same combination (zero-zero-one or one-one-zero). For an even word length, the start bits 26 repeat in an alternating manner between zero-zero-one and one-one-zero. In the first set of binary indicators 25, each of the data bits 28 is set to the opposite state of the preceding bit. In the second set of binary indicators 30, the start bits 26 are opposite the preceding bit. The data bits 28 of the second set of binary indicators 30 define binary numbers between zero and $2^n-1$ where "if" is the number of data bits 28 present in the second set of binary indictors 30.

In operation, the encoding sequence is used to detect the current position of an actuator. The encoding sequence permits the logic circuit 50 to determine the current position of the actuator by moving the actuator for a distance corresponding to a number of positions 32 equal to the word length 24 of the sets of binary indicators 25, 30. As discussed in more detail below, the positions 32 across which the actuator moves need not correspond to a single word, but may span a portion of two adjacent words. Thus, the logic circuit 50 may rapidly determine the current position upon power up without requiring that the position be stored when power is cycled and without requiring a unique identifier for each position. Further, the logic circuit 50 does not require that the start of a word first be identified and then subsequently require moving the actuator for a distance corresponding to the word length 24. The encoding sequence, therefore, determines the position using only two bits per position 32, namely one bit from the first set of binary indicators 25 and one bit from the second set of binary indicators 30.

The logic circuit 50 is configured to determine the position of the actuator as a function of the signals corresponding to the current state of each of the sets of binary indicators 25, 30. Referring again to FIGS. 4 and 5, transitions in state for the first set of binary indicators 25 when the actuator is moving in the forward direction, FWD, and the reverse direction, REV are shown by reference numerals 27 and 29, respectively. Transitions in state for the second set of binary indicators 30 when the actuator is moving in the forward direction, FWD, and the reverse direction, REV are shown by reference numerals 31 and 33, respectively. As the actuator is moving forward, the first set of binary indicators 25 changes state between each successive position 32 except for the transition between the first and second start bits 26. During this transition between positions 32 in which the first set of binary indicators 25 does not change state, the start bits 26 of the second set of binary indicators 30 do change state. Thus, the logic circuit 50 detects a change in state for each transition between positions 32.

Based on the sensed changes in state, the logic circuit 50 may then determine the current position of the actuator. The word length 24 is stored in the logic circuit 50. Because the logic circuit 50 detects a change in state in at least one of the sets of binary indicators 25, 30 at each transition between positions 32 along the actuator, the logic circuit 50 detects when the actuator has moved a number of positions 32 equal to the word length 24. As the actuator is moving, the state of each of the binary indicators in the first and second set of binary indicators 25, 30 is stored. The current position 32 may then be obtained by reconstructing the stored data bits 28 from the second set of binary indicators to identify a binary coded number. For example, in FIG. 4, the number may range from 0-15 with four data bits 28 or from 0-31 in FIG. 5 with five data bits 28. This reconstructed binary number, in combination with the stored start bits 26, will identify the current position 32 of the actuator.

Further, the logic circuit 50 identifies a specific location within the word as a function of the start bits 26 of the first and second set of binary indicators 25, 30. As illustrated in the forward and reverse rows 27, 29 of the tables in FIGS. 4 and 5, the first set of binary indicators 25 transitions at every position except between the two start bits 26. The logic circuit 50, therefore, identifies between which two bits within the first set of binary indicators 25 that no transition was observed to identify which bits within the word are the start bits 26. In addition, one of the start bits 26 of the second set of binary indicators 30 is always set to one state, for example, zero and the other of the start bits 26 of the second set of binary indicators 30 is always set to the other state, for example, one. As a result, the logic circuit 50 may evaluate the states of the start bits 26 of the second set of binary indicators 30 to determine which of the two start bits 26 is the first start bit, S0, and which is the second start bit, S1.

Based on the sensed transitions in state, the logic circuit 50 may also determine the direction of travel of the actuator. As previously indicated, the start bits 26 of the first and second set of binary indicators 25, 30 have a unique relationship. The transition between the two start bits 26 is the only point at which no change of state occurs in the first set of binary indicators 25. The two start bits 26 in the second set of binary indicators 25 are predefined as either a zero-one combination or a one-zero combination. By observing the state of the bits in the second set of binary indicators 30 when no transition in the first set of binary indicators 25 occurs, the direction of travel of the actuator is identified. As illustrated in FIG. 4, if the actuator is moving forward, no transition in the first set of binary indicators 25 is identified at the second start bit, S1, and the second start bit, S1, of the second set of binary indicators 30 is always zero. In contrast, if the actuator is moving in reverse, no transition in the first set of binary indicators 25 is identified at the first start bit, S0, and the first start bit, S0, of the second set of binary indicators 30 is always one.

According to another embodiment of the invention, the logic circuit 50 may be configured to determine the position of the actuator using a single start bit 26. As the actuator is moving forward, the first set of binary indicators 25 changes state between each successive position 32 except for the transition between the start bit 26 and the first data bit 28. During this transition between positions 32 in which the first set of binary indicators 25 does not change state, the second set of binary indicators 30 does change state. Thus, the logic circuit 50 detects a change in state for each transition between positions 32. Based on the sensed changes in state, the logic circuit 50 may then determine the current position of the actuator. The word length 24 is stored in the logic circuit 50. Because the logic circuit 50 detects a change in state in at least one of the sets of binary indicators 25, 30 at each transition between positions 32 along the actuator, the logic circuit 50 detects when the actuator has moved a number of positions 32 equal to the word length 24. As the actuator is moving, the state of each of the binary indicators in the first and second set of binary indicators 25, 30 is stored. The current position 32 may then be obtained by reconstructing the stored data bits 28 from the second set of binary indicators to identify a binary coded number. For example, in FIG. 6, the number may range from 0-15 with four data bits 28 or from 0-31 in FIG. 7 with live data bits 28. This reconstructed binary number, in combination with the stored start bit 26, will identify the current position 32 of the actuator.

The logic circuit 50 may also be configured to determine the direction of travel of the actuator using a single start bit 26. However, if only a single start bit 26 is used in the encoding sequence, the overall word length 24 must be an even number. As illustrated in the forward and reverse rows 27, 29 of FIG. 7, the first set of binary indicators 25 has a change of state at every position except between the start bit 26 and the first data bit 28. The logic circuit 50, therefore, identifies this transition during which the first set of binary indicators 25 does not change state. The logic circuit 50 further identifies whether the start bit 26 and first data bit 28 were either a one-one combination or a zero-zero combination. The logic circuit 50 further identifies the state of the start bit 26 and the first data bit 28 of the second set of binary indicators 30. When the actuator is moving forward, the start bit 26 and the first data bit 28 of the second set of binary indicators 30 will be a one-zero combination if the start bit 26 and the first data bit 28 of the first set of binary indicators 25 are a one-one combination, and the start bit 26 and the first data bit 28 of the second set of binary indicators 30 will be a zero-one combination if the start bit 26 and the first data bit 28 of the first set of binary indicators 25 are a zero-zero combination. In contrast, when the actuator is moving in reverse the start bit 26 and the first data bit 28 of the second set of binary indicators 30 will be a zero-one combination if the start bit 26 and the first data bit 28 of the first set of binary indicators 25 are a one-one combination, and the start bit 26 and the first data bit 28 of the second set of binary indicators 30 will be a one-zero combination if the start bit. 26 and the first data bit 28 of the first set of binary indicators 25 are a zero-zero combination. As a result, the logic circuit 50 may evaluate the start bit 26 and the first data bit 28 of both the first and second set of binary indicators 25, 30 to determine the direction of motion of the actuator when the encoding sequence includes a single start bit 26 and has an even word length 24.

In an alternate embodiment of the invention, the sensor head 35 may be unable to provide the current state of one of the binary indicators but rather be able to provide only an indication of a change in states between adjacent indicators. As illustrated in FIGS. 8 and 9, an encoding sequence employing three start bits 26 (i.e., S0, S1, and S2) may be used to detect the current position of the actuator using only information regarding the change in state of the binary indicators between adjacent positions 32. Each word begins with two start bits S0, S1. The two start bits S0, S1 are followed in sequence by the first data bit B0, the third start bit S2, and the remaining data bits. Each bit of the first set of binary indicators 25 is configured to produce an asymmetrical pattern of changes in state for the word length 24. As the actuator moves in the forward direction, there is no change of state between a prior binary indicator and a start bit 26. In contrast, there is a change of state between a prior binary indicator and each data bit 28. As illustrated by the forward transitions 27 of the first set of binary indicators 25, each of the start bits 26 are identified by a zero and each of the data bits 28 are identified by a one. In contrast, the forward transitions 31 of the second set of binary indicators 30 is configured to generate a one for each of the start bits 26 and a binary encoded number for the data bits 28. The current position 32 may then be obtained by reconstructing the changes of state in the second set of binary indicators 30 corresponding to data bits 28 to identify a binary coded number. For example, in FIG. 8, the number may range from 0-15 with four data bits 28 or from 0-31 in FIG. 9 with five data bits 28. This reconstructed binary number, in combination with the changes of state for the start bits 26, will identify the current position 32 of the actuator.

Based on the sensed transitions in state, the logic circuit 50 may also determine the direction of travel of the actuator. As previously indicated, the changes in state between adjacent bits for the first set of binary indicators 25 results in a zero-zero combination for the first two start bits S0, S1 a single zero at the third start bit S2, and a single one between the two sets of start bits for the first data bit B0. As the logic circuit 50 monitors the changes of state for the first set of binary indicators 25, the pair of zeros occurs prior to the single zero in the forward direction 27 but the pair of zeros occurs after the single zero in the reverse direction 29. Consequently, the logic circuit 50 may monitor the changes in state of the start bits 26 corresponding to the first set of binary indicators 25 to identify the direction the actuator is moving.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A method for detecting a position of an actuator, t actuator having a first member axially movable with respect to a second member, comprising the steps of:
    axially spacing a first set of binary indicators located in a first plane along the first member of the actuator, wherein each binary indicator defines one bit within a word, the word has a predefined length, and each binary indicator defining a position of the first member with respect to the second member;
    axially spacing a second set of binary indicators located in a second plane along the first member of the actuator, wherein the second plane is generally parallel to the first plane and each of the binary indicators in the second set corresponds to one of the binary indicators in the first set;
    positioning at least one sensor at a location radially spaced from the first actuator, the sensor configured to generate a first signal corresponding to the change of state of the first set of binary indicators and to generate a second signal corresponding to the change of state of the second set of binary indicators;
    moving the actuator a distance corresponding to the word length of each set of the binary indicators;
    sensing the first and second sets of binary indicators with the at least one sensor while moving the actuator; and
    determining the position of the actuator as a function of the first and second signals.

2. The method of step 1 wherein sensing the first and second sets of binary indicators further comprises the step of:
    detecting a change of state in each of the first and second sets of binary indicators, wherein at least one of the first and second sets of binary indicators changes state at each position.

3. The method of claim 2 further comprising the step of determining a direction of motion of the actuator as a function of the first and second signals.

4. The method of claim 3 wherein:
    the word length for each of the first set and second set of binary indicators is defined by a first start bit, a second start bit, and a plurality of data bits;
    the first and second start bits of the first set of binary indicators are set equal to each other;
    one of the first and second start bits of the second set of binary indicators is set to a logical one; and
    the other of the first and second start bits of the second set of binary indicators is set to a logical zero.

5. The method of claim 3 wherein:
    the word length for each of the first set and second set of binary indicators is defined by a first start bit and a plurality of data bits;
    the start bit is set equal to the first data bit for the first set of binary indicators;
    the remaining data bits for the first set of binary indicators alternate from the previous data bit; and
    the start bit is set opposite to the first data bit for the second set of binary indicators.

6. The method of claim 3 wherein:
    the word length for each of the first set and second set of binary indicators is defined by a first start bit, a second start bit, a third start bit, and a plurality of data bits;
    each of the first, second, and third start bits of the first set of binary indicators is set equal to the preceding bit; and
    each of the first, second, and third start bits of the second set of binary indicators is set opposite to the preceding bit.

* * * * *